Patented Oct. 3, 1922.

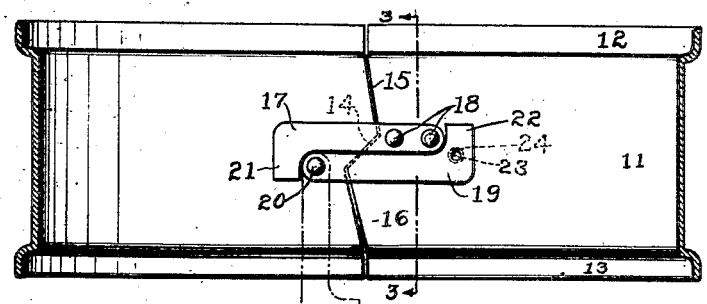
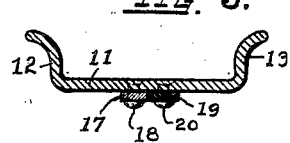
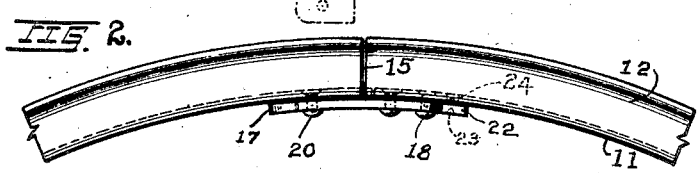
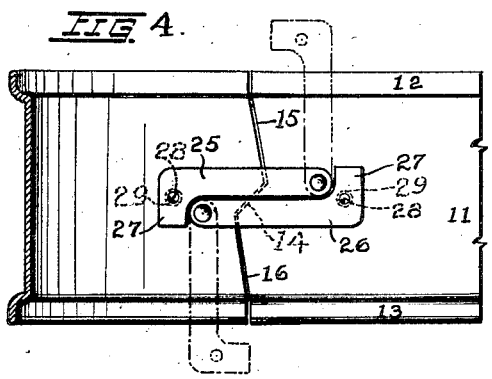
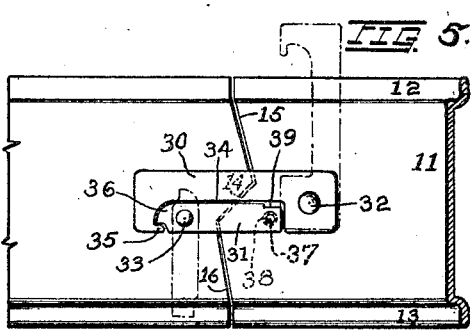
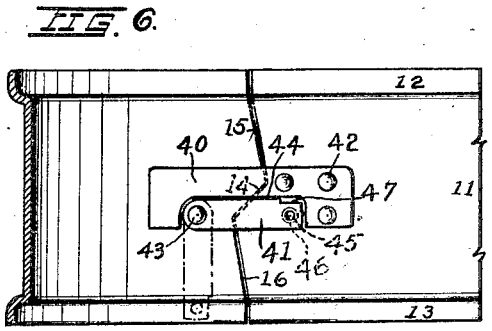
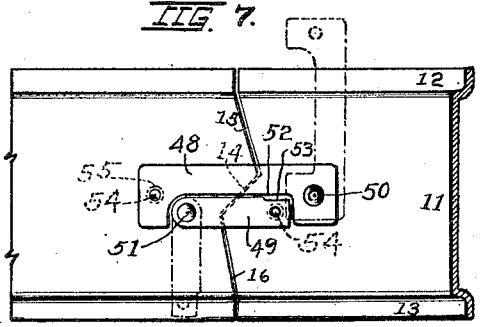

1,430,658

UNITED STATES PATENT OFFICE.

BERT M. KENT, OF CLEVELAND, OHIO, ASSIGNOR TO THE STANDARD PARTS COMPANY, OF CLEVELAND, OHIO, A CORPORATION OF OHIO.

RIM.

Application filed July 30, 1919. Serial No. 314,337.

*To all whom it may concern:*

Be it known that I, BERT M. KENT, a citizen of the United States, and a resident of Cleveland, county of Cuyahoga, State of Ohio, have invented certain new and useful Improvements in Rims, of which the following is a specification.

This invention relates to vehicle wheel rims and more particularly to demountable transsplit rims, such as are commonly used on motor vehicle wheels. Rims of this type are usually formed with integral side flanges for retaining a resilient tire upon the rim, means being provided for locking the ends of the rim together but permitting relative motion of the ends of the rim, when it is desired to remove or replace a tire, upon motion of the locking means from locking position.

One of the objects of this invention is to provide a rim of this type which has a substantial and effective locking device, and which can be economically manufactured. Another object of the invention is the provision of a rim of this type having locking means which will permit one end of the rim to be moved radially inwardly when it is desired to remove or replace a tire, but which, when moved to locking position, will effectively prevent relative motion of the rim ends in any direction, and which can be easily moved to or from locking position.

Other objects of the invention and the features of novelty will be apparent from the following description, taken in connection with the accompanying drawings, in which:—

Figure 1 is a fragmentary bottom plan view of a vehicle wheel rim embodying my invention;

Fig. 2 is a fragmentary side elevation of the structure shown in Fig. 1;

Fig. 3 is a cross-section on the line 3—3 of Fig. 1; and

Figs. 4, 5, 6 and 7 are fragmentary plan views, similar to Fig. 1, showing various modied forms of locking means embodying my invention.

In all of the modified structures illustrated in the drawings, I have indicated at 11 a vehicle wheel rim of the usual type having integral tire-retaining flanges 12 and 13 at the edges thereof, and being transsplit, so that one end of the rim may be moved radially relatively to the other end thereof and the rim collapsed, to facilitate the removal or replacement of a tire. It is necessary, in a rim of this type, to provide means which will prevent such relative movement of the ends of the rim when the tire mounted thereon is inflated, whether the tire is in use on a wheel or is carried as a "spare." To this end, I have provided each end of the rim with a plate, which is secured thereto and is adapted to extend across the split in the rim and engage with the inner surface of the other end thereof, when the ends of the rim are in abutting relation, at least one of said plates being movable to a position in which it does not bridge the split in the rim, so as to permit the rim to be collapsed. The plates are also adapted to engage and cooperate with each other, to prevent separation of the rim ends in a circumferential direction.

The split of the rim is preferably formed along a broken line, a portion of the split, as indicated at 14, being sharply inclined relatively to the edges of the rim, thus providing cooperating shoulders on the rim ends which will hold them from relative lateral motion in one direction. It will be understood that the split of the rim may take many forms, in which similarly engaging shoulders are provided, and the desired effect obtained. It is preferable, however, that the split extend from the inclined portion 14 to the flanges of the rim along the lines 15 and 16 which are substantially parallel and inclined, relatively to the edges of the rim, in a direction opposite to that of the portion 14 of the split, and extend though the flanges of the rim along lines perpendicular to the edges of the rim and intersecting such edges at directly opposite points. By thus forming the split, the desired effect may be obtained, and each end of the rim is provided with beveled projections thereon which will cooperate to hold the ends of the rim in proper alinement.

In the structure illustrated in Figs. 1 to 3, the plate 17 is rigidly secured to one end of the rim by rivets 18, or in any other suitable manner, and the plate 19 is pivotally secured to the other end of the rim, as by a rivet 20, being movable from the dotted-line position shown in Fig. 1 to the full-line position shown therein. The plates 17 and 19 are preferably provided with laterally extending portions 21 and 22, respectively, which are each adapted to engage with a part of the other plate, to hold the ends of the rim together. It will be understood that to obtain this result, but one of these plates need be provided with such a lateral projection, 21 or 22, and that the length of pivoted member 19 need be only sufficient to permit it to bridge the split of the rim. A slight projection 23 is formed on the pivoted plate 19, to engage in an opening 24 in the rim, to hold the plate in locking position. The plates 17 and 19, when in the full-lines position shown, will cooperate to prevent relative lateral motion of the rim ends in one direction, by reason of the engagement of the plates 17 with the plate 19, adjacent its pivot 20, the rim ends being held from relative radial motion in the opposite direction by the engagement of the shoulders of the rim ends, heretofore described.

In the modified structure shown in Fig. 4, the plates 25 and 26, respectively, similar in shape to the plates 17 and 19 shown in Fig. 1, are provided, both of said plates, however, being pivotally secured to the rim ends. Each of the plates has a laterally projecting portion 27 adapted to engage with the other plate, to hold the rim ends together, and each is formed with a projection 28 adapted to engage with an opening 29 in the rim, to hold the members in locking position. It will be understood that the plates 25 and 26, when in the full-line position shown in Fig. 4, will also prevent relative radial movement of the ends of the rim and that, by reason of the engagement of each of the laterally extending portions 27 with the other plate adjacent its pivot, any tendency of the rim ends to move laterally relatively to each other, in one direction, will only serve to hold the ends of the rim more closely together.

In the structure shown in Fig. 5, the plates 30 and 31 are pivotally secured to the ends of the rim, as shown at 32 and 33, respectively, the plate 30 being formed with a lateral recess 34, to receive the plate 31 when the parts are in locking position, to lessen the liability of such parts being accidentally moved from such locking position. The plate 30 is provided with a rearwardly extending lip 35 thereon, and the plate 31 constitutes a lever having one end 36 thereof adapted to engage the lip 35 to complete the rotation of the plate 30 to its locking position, the other end of the lever extending across the split of the rim and being preferably provided with a projection 37 for engagement with an opening 38 in the rim, to hold the plates 30 and 31 in the position shown. One corner of the plate 31 is preferably cut away, as shown at 39, to permit the entry of a screw driver or other instrument therein, to facilitate the movement of the locking plates from locking position.

In the structure shown in Fig. 6, the plate 40 on one end of the rim is rigidly secured thereto, as by rivets 42, and the plate 41 is pivotally secured, as shown at 43, to the other end thereof and adapted to be moved to the full-line position shown, in which it bridges the split of the rim and is positioned within the side recess 44 of the member 40. The pivoted member 41 is preferably provided with a projection 45, for engagement with an opening 46 in the rim, to hold the member in locking position, and its corner is preferably cut away, as shown at 47, to facilitate its movement from locking position.

In the structure shown in Fig. 7, the plates 48 and 49 are identical in outline with the plates 40 and 41 shown in Fig. 6, but both of the plates are pivotally mounted on the rim, as shown, respectively, at 50 and 51. The member 48 is provided with a recess 52, to receive the member 49, when the parts are in locking position, and the corner of the member 49 is preferably cut away, as shown at 53, for the insertion of an operating tool, as in the structure shown in Fig. 6. Since both members are pivotally mounted, they are preferably each provided with a projection 54 for engagement in the openings 55 in the rim, to hold them in locking position.

In all of the modified structures, it will be understood that, when the locking plates are in the full-line positions shown in the drawings, the plates will cooperate to hold the ends of the rim from relative radial movement, to hold the ends of the rim together circumferentially, and to hold the ends of the rim from relative lateral movement in one direction; and that relative lateral movement of the rim ends in the other direction is prevented, by the engagement of the shoulders formed on the rim ends, as heretofore described. If it is desired to remove or replace a tire, and the pivoted plate on one end of the rim is moved to such a position that it no longer bridges the split, the other end of the rim can be moved radially inwardly sufficiently to permit the rim to be collapsed.

Having thus described my invention, what I claim is:—

1. A transsplit rim for a vehicle wheel, having means for securing the ends of the rim together, comprising members respectively secured to the ends of the rim and extending across the split, one of said members being rotatable to a position in which it does not cross the split of the rim, and one of said members having a side opening to receive the other member.

2. A transsplit rim for a vehicle wheel, having a pair of plates pivotally secured to the ends thereof, each of said plates, in one position, extending across the split of said rim, one of said plates having a side opening to receive the other plate.

3. A transsplit rim for a vehicle wheel, and means for securing the ends of the rim together, comprising members secured to the ends of the rim and extending across the split, one of said members being rotatable to a position in which it does not cross the split of the rim, and means for holding said rotatable member in rim-securing position.

4. A transsplit rim for a vehicle wheel, and means for securing the ends of the rim together, comprising a hook-shaped plate pivotally secured to one end of the rim and adapted to extend across the split therein, and a lever pivotally secured to the other end of the rim and having an arm engaging the hooked end of said plate to rotate it to rim-securing position, the other arm of said lever extending across the split in the rim when the parts are in rim-securing position.

In testimony whereof I affix my signature.

BERT M. KENT.